(12) United States Patent
Brown, Jr. et al.

(10) Patent No.: US 6,450,833 B1
(45) Date of Patent: Sep. 17, 2002

(54) SEVEN-WAY TRAILER CONNECTOR

(75) Inventors: James B. Brown, Jr., Lafayette; Danny Lee Gilbert, Monticello, both of IN (US)

(73) Assignee: Wabash Technology Corporation, Naperville, IL (US)

(*) Notice: Subject to any disclaimer, the term of this patent is extended or adjusted under 35 U.S.C. 154(b) by 0 days.

(21) Appl. No.: 09/645,838

(22) Filed: Aug. 25, 2000

(51) Int. Cl.[7] .............................................. H01R 29/00
(52) U.S. Cl. ...................................................... 439/518
(58) Field of Search ................................ 439/518, 655, 439/654, 172, 686, 695

(56) References Cited

U.S. PATENT DOCUMENTS

| | | | |
|---|---|---|---|
| 3,229,240 A | * | 1/1966 | Harrison ...................... 439/692 |
| 4,770,644 A | | 9/1988 | Feder |
| 5,302,141 A | | 4/1994 | O'Reilly et al. |
| 5,362,258 A | * | 11/1994 | Arnswald et al. ............ 439/695 |
| 5,443,389 A | * | 8/1995 | Hughes ........................ 439/35 |
| 5,488,352 A | | 1/1996 | Jasper |
| 5,739,592 A | | 4/1998 | Rigsby et al. |
| 5,800,188 A | * | 9/1998 | Barber et al. ................ 439/142 |

FOREIGN PATENT DOCUMENTS

| | | |
|---|---|---|
| DE | 29815964 | 1/1999 |
| DE | 29821387 | 5/1999 |
| EP | 544630 | 6/1993 |
| EP | 585917 | 3/1994 |
| EP | 1006624 | 6/2000 |

\* cited by examiner

Primary Examiner—Brian Sircus
Assistant Examiner—Brian S. Webb
(74) Attorney, Agent, or Firm—Trexler, Bushnell, Giangiorgi, Blackstone & Marr, Ltd.

(57) ABSTRACT

A trailer connector to which a conventional connector from a tractor can be attached includes an electrical housing assembly and a lid and connector assembly. The electrical housing assembly includes a non-conductive housing which is mounted to the trailer and a plurality of conductive studs, a plurality of conductive terminals, and a non-conductive cap mounted within the housing. The cap has a plurality of passageways provided therein. Each terminal has a first end connected to a respective one of the studs and a second end which is in communication with a respective one of the passageways through the cap. A conventional wiring harness is attached to the studs. The lid and connector assembly includes a lid portion which is attached to the housing and a connector portion which is capable of being connected to and removed from the lid portion. The connector portion includes a plurality of pins which extend therethrough and interface with the cap. A conventional connector from the tractor can be connected to the opposite side of the connector portion.

12 Claims, 6 Drawing Sheets

SEVEN-WAY TRAILER CONNECTOR

BACKGROUND OF THE INVENTION

This invention is generally directed to an improved trailer connector which is capable of being connected to a connector from an associated tractor by wiring.

The lights on a semi-trailer are controlled from the semi-tractor through electrical wiring. Because the trailer and tractor are not permanently attached, the electrical wiring is made to be removable. This is accomplished through the use of a connector on the trailer and a connector on the tractor, with a flexible, removable connection cable that connects the tractor and the trailer.

Current suppliers of trailer connectors include Tramec, Grote, Cole Hersey, Phillips, Haldex, Berg and Pollak. The connectors come in a variety of styles and shapes, with certain portions of the connector being dictated by an SAE standard, designated the J560 connector. Mounting configurations and the materials in which the connectors are made from differ substantially from supplier to supplier.

The prior art connectors tend to be difficult to connect wires to and are cumbersome to install on the trailer. These drawbacks negatively impact factory installations, retrofit installations and replacement installations because the installation takes increased time and can be difficult for the worker to install. In addition, the prior art connectors do not allow for future expansion, such as circuit boards and indicator lights.

The present invention provides a novel connector for a trailer which overcomes the problems presented in the prior art and which provides additional advantages over the prior art. These advantages will become clear upon a reading of the attached specification in combination with a study of the drawings.

OBJECTS AND SUMMARY OF THE INVENTION

A general object of the present invention is to provide a novel trailer connector which provides for improved installation of the trailer connector over the prior art.

Another general object of the present invention is to provide a novel trailer connector which provides for improved serviceability of the trailer connector over the prior art.

Briefly, and in accordance with the foregoing, the present invention discloses a trailer connector to which conventional wiring from a tractor can be attached. The trailer connector includes an electrical housing assembly and a lid and connector assembly.

The electrical housing assembly includes a non-conductive housing which is mounted to the trailer and a plurality of conductive studs, a plurality of conductive terminals, and a non-conductive cap mounted within the housing. The cap has a plurality of passageways provided therein. Each terminal has a first end connected to a respective one of the studs and a second end which is in communication with a respective one of the passageways in the cap. A conventional wiring harness is attached to the studs.

The lid and connector assembly includes a lid portion which is attached to the housing and a connector portion which is capable of being connected to and removed from the lid portion. The connector portion includes a plurality of pins which extend therethrough and interface with the cap. A conventional connector from the tractor can be connected to and removed from the opposite side of the connector portion.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1:
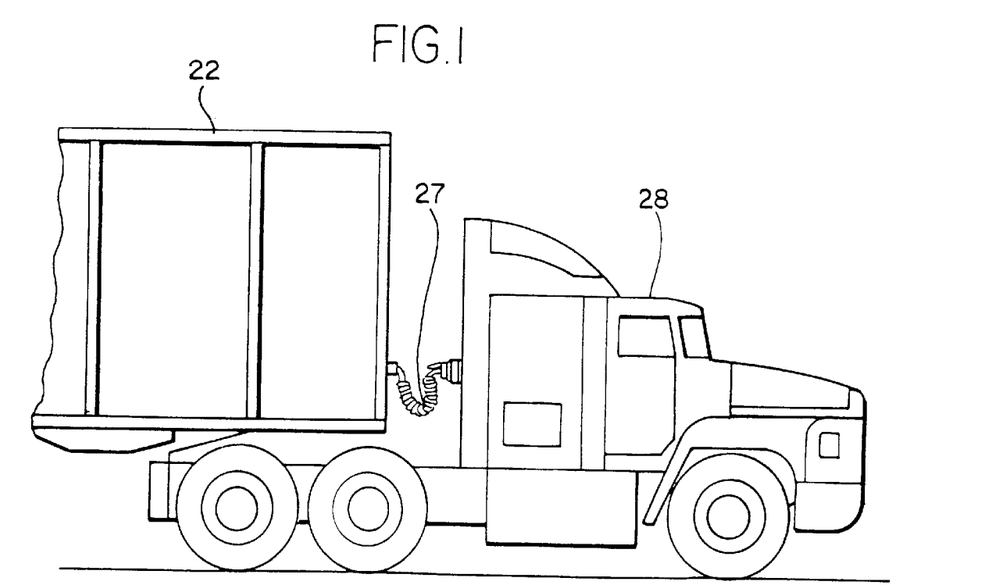
FIG. 1 is a partial side elevational view of a tractor and trailer which has the novel trailer connector of the present invention provided on the trailer.
Figure 2:
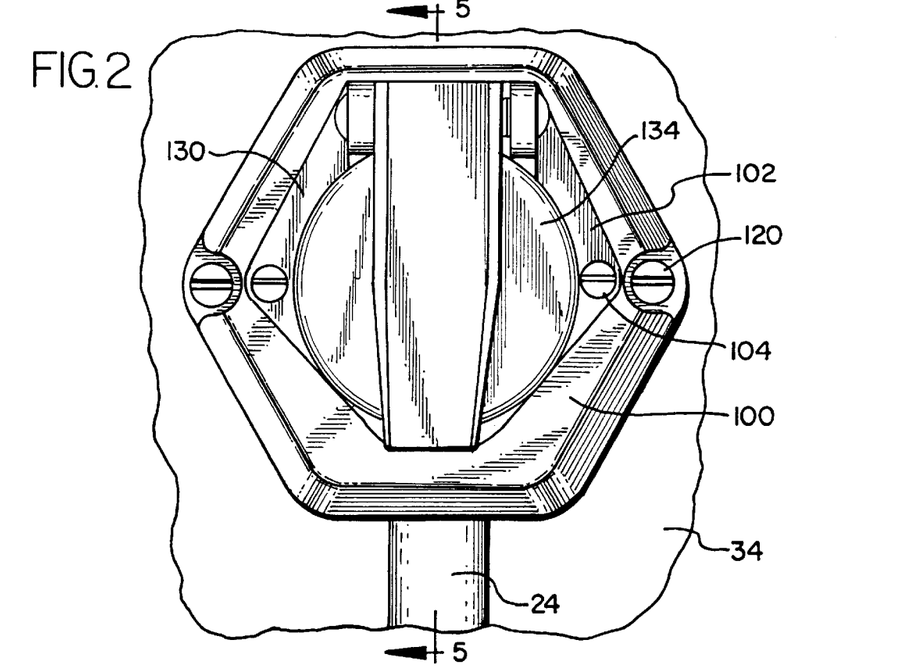
FIG. 2 is a front elevational view of the trailer connector which incorporates the features of the invention.
Figure 3:
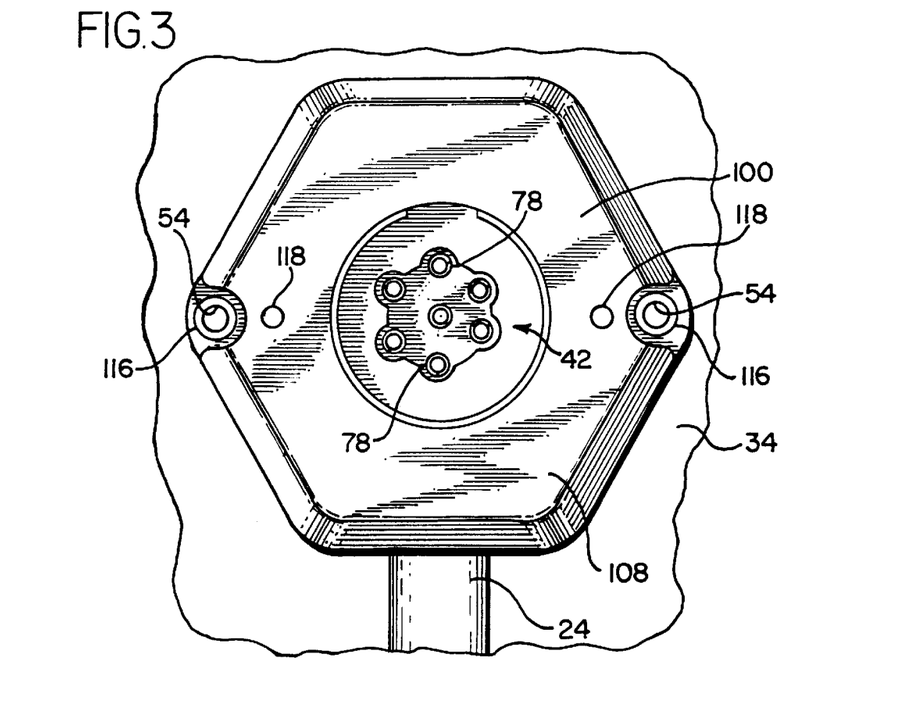
FIG. 3 is a front elevational view of a portion of the trailer connector which incorporates the features of the invention.
Figure 4:
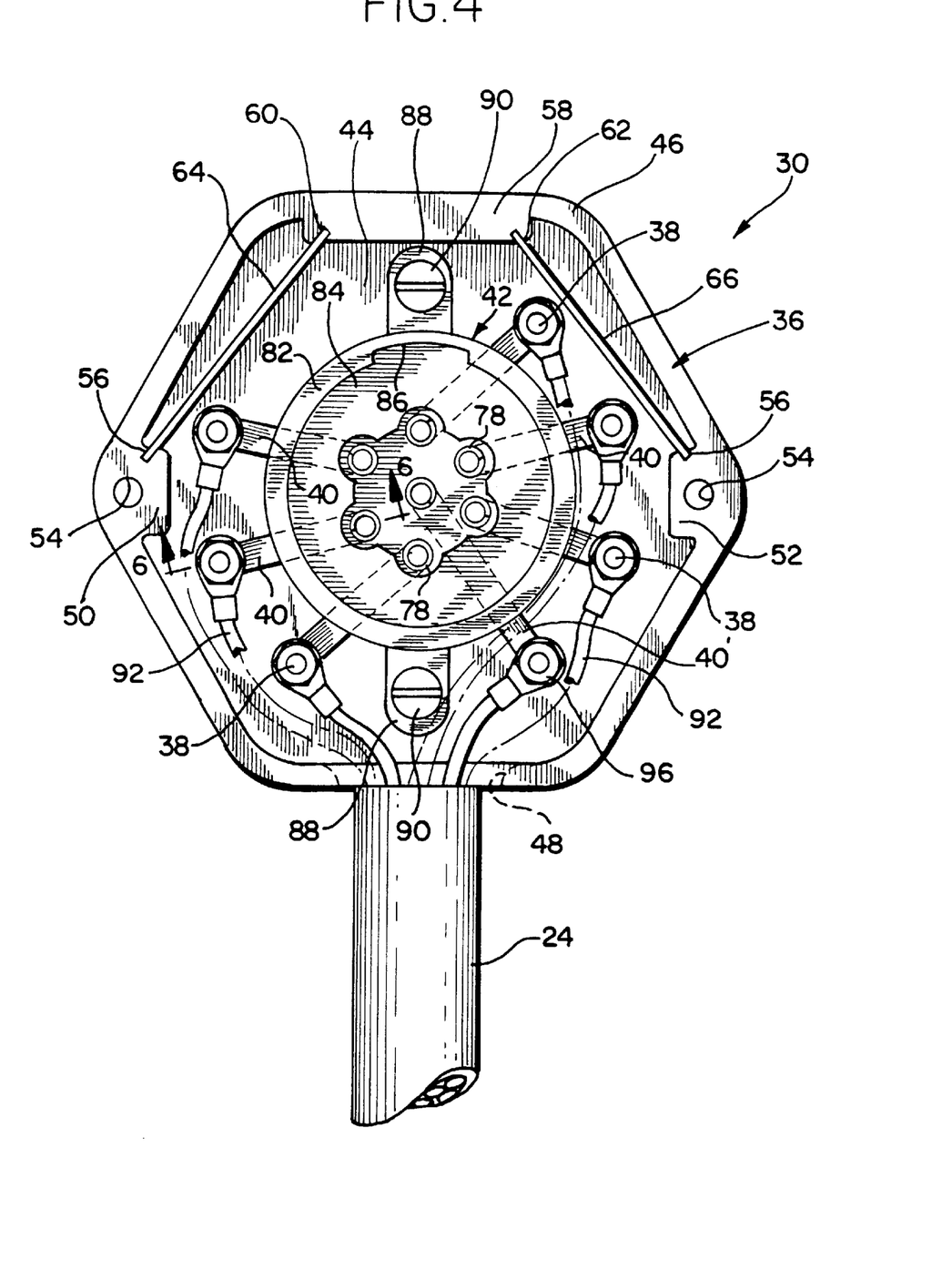
FIG. 4 is a front elevational view of another portion of the trailer connector which incorporates the features of the invention.
Figure 5:
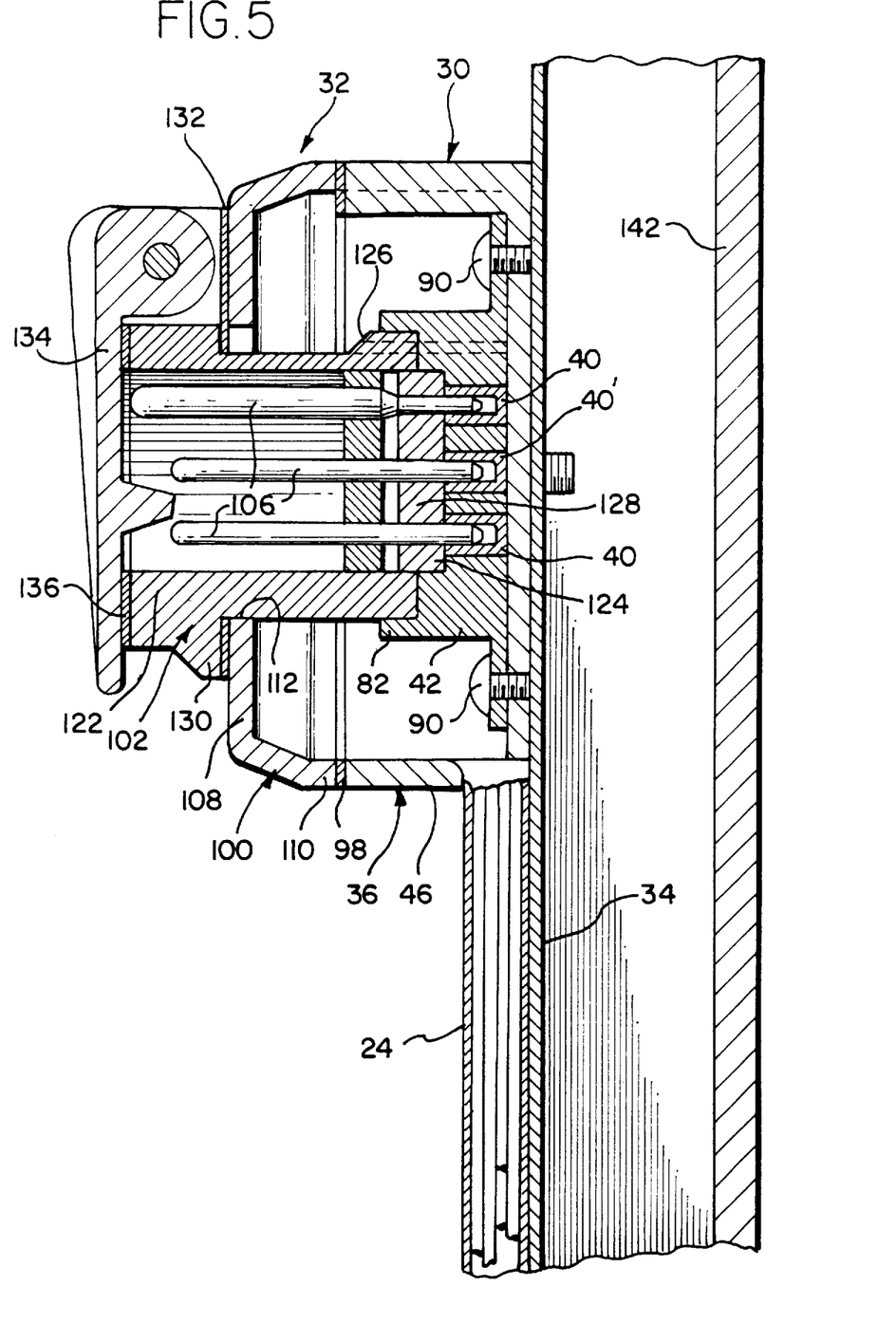
FIG. 5 is a cross-sectional view of the trailer connector along line 5—5 of FIG. 2.
Figure 6:
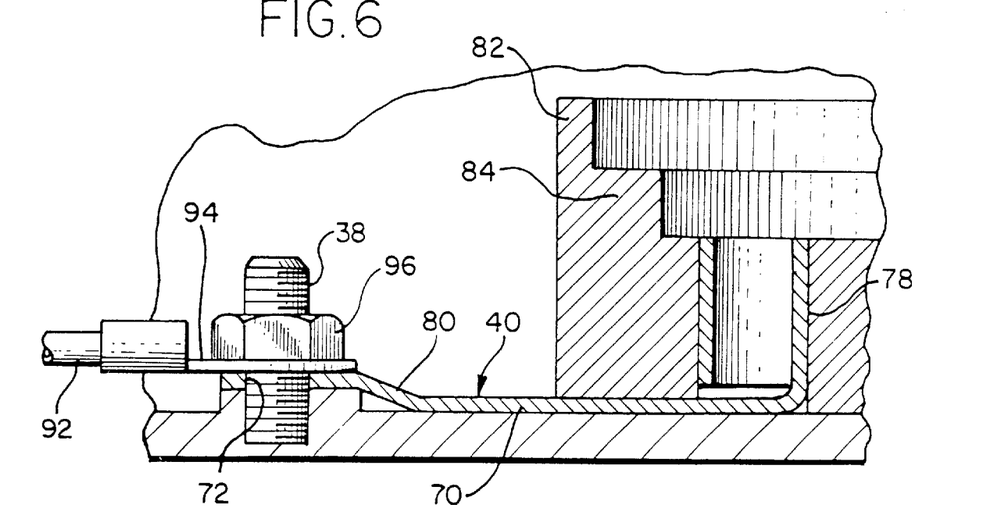
FIG. 6 is a cross-sectional view of the trailer connector along line 6—6 of FIG. 4.

The novel trailer connector 20 of the present invention is mounted on a conventional trailer 22 which has a conventional wiring harness 24 thereon. The trailer connector 20 used to connect the wiring harness 24 thereto and to connect a conventional J560 connector 26 thereto. The conventional J560 connector 26 is attached to a jumper cable 27 which extends from the J560 connector connected to a tractor 28. The trailer connector 20 of the present invention allows an operator to easily connect, and disconnect, the J560 connector 26 to, and from, the tractor 28 to the trailer 22.

The connector 20 includes an electrical housing assembly 30 and a lid and connector assembly 32. The electrical housing assembly 30 provides a mounting face for the J560 connector 26. The lid and connector assembly 32 covers the electrical housing assembly 30.

The electrical housing assembly 30 is mounted to a front wall 34 of the trailer 22. The electrical housing assembly 30 includes a non-conductive housing 36, a plurality of conductive threaded studs 38 mounted to the housing 36, a plurality of conductive terminals 40, 40', and a non-conductive cap 42 mounted to the housing 36.

The housing 36 includes a flat base 44 which aligns with the front wall 34 of the trailer 22 and a ring 46 which protrudes outwardly from the base 44 and is perpendicular to the front wall 34 of the trailer 22. A wiring passageway 48 is provided through the ring 46. The ring 46 may be six-sided as shown, circular or may take another form.

The ring 46 has first and second protuberances 50, 52 which extend inwardly therefrom and are diametrically opposed from each other. Each protuberance 50, 52 has an aperture 54 provided therethrough in the center thereof. In addition, each protuberance 50, 52 has a slot 56 provided therein. The ring 46 has a third protuberance 58 which extends inwardly therefrom and is equally spaced between the first and second protuberances 50, 52. The third protuberance 58 has a pair of slots 60, 62 therein which are on opposite sides thereof. A first printed circuit board 64 is mounted within the slots 56, 60 on the first and third protuberances 50, 58. A second printed circuit board 66 is mounted within the slots 56, 62 on the second and third protuberances 52, 58.

The threaded studs 38 are connected to the base 44 and extend outwardly therefrom. Each threaded stud 38 is made of a suitable conductive material, such as metal. The studs 38 are spaced apart from each other and each stud 38 is positioned along a radial line from a centerpoint of the base 44. As shown, seven threaded studs 38 are provided.

Terminals 40, 40' extend from the threaded studs 38 toward the centerpoint of the base 44. Each terminal 40, 40' is made of a suitable conductive material, such as metal. The outer end of each terminal 40, 40' is attached to the respective stud 38 by way of an aperture which is provided through the outer end of the terminal 40, 40' such that the outer end of the terminal 40, 40' surrounds the stud 38. The inner ends of the terminals 40, 40' are spaced apart from each other and the terminals 40, 40' do not overlap each other as they extend inwardly. Six of the seven inner ends are positioned along a radial line from the centerpoint of the base 44. The inner end of the seventh terminal 40' is positioned at the centerpoint of the base 44.

Figure 7:
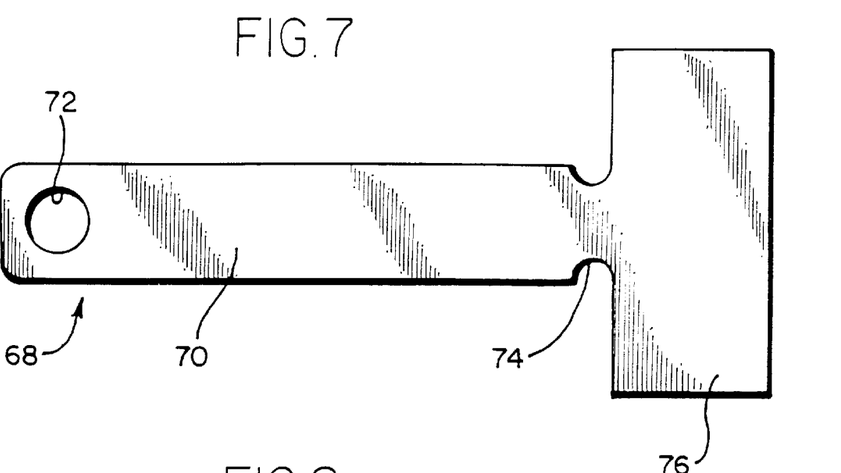
FIGS. 7 and 8 are top plan views of stamping showing how a terminal that is used in the trailer connector is formed.
Figure 8:
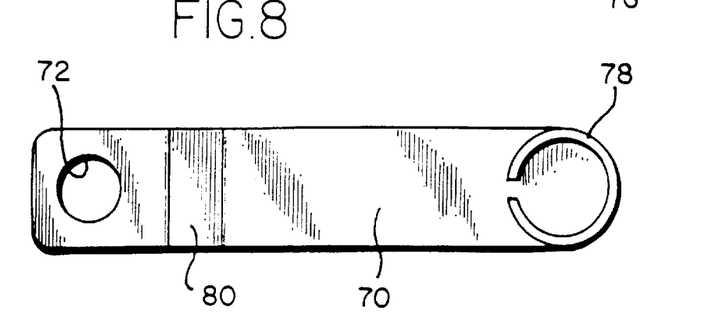

As shown in FIGS. 7 and 8, each terminal 40, 40' is formed from a metal stamping 68. When stamped, the stamping 68 includes an elongated portion 70 which has an aperture 72 therethrough at an end thereof, a necked down portion 74 at the opposite end of the elongated portion 70, and a rectangular portion 76 at the other end of the necked down portion 74, such that the necked down portion 74 is between the rectangular portion 76 and the elongated portion 70. The stamping 68 is bent along the necked down portion 74 so that the rectangular portion 76 is perpendicular to the elongated portion 70. Thereafter, the rectangular portion 76 is rolled so that a generally C-shaped portion 78, see FIG. 8, is formed. The elongated portion 70 is bent proximate to the aperture 72 to form an angled portion 80 such that the aperture 72 is in a different plane than the remainder of the elongated portion 70. The C-shaped portion 78 forms the inner end of the terminal 40, 40'. The aperture 72 is provided at the outer end of the terminal 40, 40'.

The cap 42 is mounted on the base 44 and overlays the inner ends of the terminals 40, 40'. The cap 42 has a generally circular outer wall portion 82 and a middle portion 84 which has a length that is less than the outer wall portion 82, such that a recess is formed within the cap 42. A keyway 86 is provided in the inner surface of the outer wall portion 82, but is not necessary. A pair of ears 88 extend radially outwardly from the outer wall portion 82. Each ear 88 has an aperture provided therethrough.

Seven passageways are provided within the middle portion 84 of the cap 42 and are spaced apart from each other. Six of the passageways are positioned along radial lines from a centerpoint of the cap 42. The seventh passageway is provided at the centerpoint of the cap 42.

To mount the cap 42 onto the base 44, the C-shaped 78 portions of the terminals 40, 40' are inserted into the respective passageways within the cap 42. Fasteners 90 are inserted through respective apertures in the base 44 and through the respective apertures in the ears 88. As such, the cap 42 sits over an inner portion of each terminal 40, 40'. If desired, the cap 42 can be provided with cutouts in the side that sits over the inner portion of the terminals 40, 40' which match the configuration of the inner portion of the terminals 40, 40'. It is to be understood that the ears 88 and fasteners 90 can be eliminated and the cap 42 can be attached to the base 44 by other suitable means.

The wiring harness 24 is attached to the studs 38, and thus the terminals 40, 40', in the electrical housing assembly 30. The wiring harness 24 is connected to lighting and other electrical devices located on the trailer 22. The wiring harness 24 includes seven wires 92 therein, which, as known in the art, are coded as the brown wire, the green wire, the red wire, the white (ground) wire, the black wire, the yellow wire and the blue (auxiliary) wire. Each wire 92 has a metal end 94 attached thereto which has an aperture therethrough.

The wiring harness 24 is inserted through the wiring passageway 48 in the housing 36 and the respective wires 92 are attached to the respective threaded studs 38 by inserting the respective metal end 94 over the threaded stud 38. The angled portion 80 of the respective terminal 40, 40' sits under the metal end 94 of the respective wire 92 extending from the wiring harness 24. A nut 96 is secured onto the stud 38 to secure the metal end 94 of the wire 92 and the outer end of the terminal 40, 40' to the threaded stud 38.

The lid and connector assembly 32 covers the electrical housing assembly 30. The lid and connector assembly 32 includes a resilient gasket member 98, a lid portion 100 and a connector portion 102. The lid portion 100 and the connector portion 102 are secured together by fasteners 104, but can be easily disassembled from each other. The connector portion 102 includes the standard pins 106 used in a J560 connector.

The resilient gasket member 98 is seated on the outer surface of the ring 46 of the electrical housing assembly 30 and is sandwiched between the ring 46 and the lid portion 100. The gasket member 98 is formed from a suitable material, such as rubber.

The lid portion 100 is formed from a non-conductive material. The lid portion 100 has an outer wall 108 and a skirt 110 which depends therefrom and is shaped to match the shape of the ring 46 such that when the lid portion 100 is seated on the ring 46, the housing 36 is covered by the lid portion 100. An enlarged aperture 112 is provided through the center of the outer wall 108. The aperture 112 is slightly larger than the size of the cap 42.

A first set of apertures 116 are provided through the outer wall 108 proximate to the outer edge thereof and are diametrically opposed to each other. A second set of apertures 118 are provided through the outer wall 108 and are diametrically opposed to each other. Each aperture 118 in the second set is proximate to one of the apertures 116 in the first set, but is spaced therefrom.

When the lid portion 100 is seated on the housing 36, the gasket member 98 is sandwiched therebetween. A cavity is formed between the base wall 44 of the housing 36 and the outer wall 108 of the lid portion 100, between the cap 42 mounted on the housing 36 and the outer wall 108 of the lid portion 100, and between the threaded studs 38 mounted on the housing 36 and the outer wall 108 of the lid portion 100. The skirt 110 may extend around the outer surface of the ring 46 so as to enclose the gasket member 98 between the lid portion 100 and the housing 36. The aperture 112 in the outer wall 108 aligns with, but is spaced from, the cap 42. The first set of apertures 116 align with the apertures 54 in the first and second protuberances 50, 52 on the housing 36. As described further herein, fasteners 120, such as screws, are mounted within the aligned apertures 54, 116 to secure the lid portion 100 to the housing 36.

The connector portion 102 is mounted to the lid portion 100. The connector portion 102 includes a tubular wall 122 and an end wall 124 at a first end thereof. The outer shape of the tubular wall 122 matches the shape of the inner surface of the outer wall portion 82 of the cap 42. A key 126 extends outwardly from the tubular wall 122 along the length thereof, but is not necessary. If provided, the shape of the key 126 matches the shape of the keyway 86 in the cap 42 in the electrical housing assembly 30. A plurality of spaced apart, conductive pins 106 extend generally from the second end of the tubular wall 122 and through the end wall 124 such that the pins 106 extend outwardly from the end wall 124. A spacer member 128 is provided within the tubular wall 122 and is spaced apart from the end wall 124. The pins 106 extend through the spacer member 128. A mounting flange 130 extends outwardly from the tubular wall 122 proximate to the second end thereof. A pair of apertures are provided through the mounting flange 130 proximate to the outer edge thereof and are diametrically opposed to each other. A gasket member 132 is provided on the surface of the mounting flange 130 which faces the first end.

A cover 134 is hingedly mounted on the mounting flange 130 and covers the second end of the tubular wall 122. The cover 134 is preferably spring loaded to maintain the cover 134 in the closed position, that is, such that the cover 134 abuts against the second end of the tubular wall 122. A gasket member 136 is provided on the inner surface of the cover 134 to cushion the interface between the cover 134 and the second end of the tubular wall 122.

Figure 11:
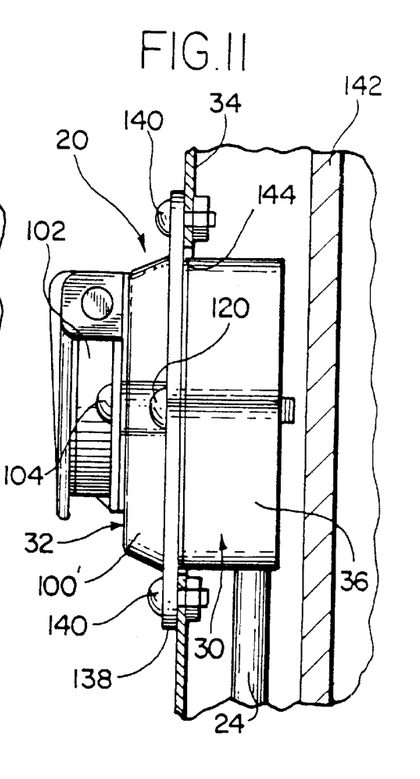
FIG. 11 is a partial cross-sectional view showing the mounting of the trailer connector using a recessed mount.

The connector 20 can be mounted on the trailer 22 using a surface mount, as shown in FIGS. 2–10, or as a recessed mounted, as shown in FIG. 11.

To mount the connector 20 on the trailer 22 using a surface mount as shown in FIGS. 2–10, the base 44 is placed against the front wall 34 of the trailer 22. Fasteners 120, such as screws, are mounted within the aligned apertures 54, 116 to secure the lid portion 100 to the housing 36, and further pass through the front wall 34 of the trailer 22 to secure the electrical housing assembly 30 and the lid portion 100 to the front wall 34 of the trailer 22. The ends of the fasteners 120 are positioned between the front wall 34 and the front plywood wall 142 of the trailer 22. The wiring harness 24 seats against the outer side of the front wall 34.

To mount the connector 20 on the trailer 22 using a recessed mount as shown in FIG. 11, a modified lid portion 100' is used. The modified lid portion 100 includes a mounting flange 138 which extends outwardly from the skirt 110. A pair of apertures are provided through the mounting flange 138 and are diametrically opposed from each other.

Initially, the lid portion 100' is secured to the electrical housing assembly 30 by passing fasteners 120, such as screws, within the aligned apertures 54, 116. The mounting flange 138 of the modified lid portion 100' extends outwardly from the housing 36.

The housing 36 of the electrical housing assembly 30 is passed through an aperture 144 cut into the front wall 34 of the trailer 22 until the mounting flange 138 of the modified lid portion 100' abuts against the outer surface of the front wall 34. Fasteners 140, such as screws, are passed through the apertures in the mounting flange 138 and through the front wall 34 of the trailer 22. The ends of the fasteners 140 are positioned between the front wall 34 and the front plywood wall 142 of the trailer 22. The wiring harness 24 is positioned between the front wall 34 and the front plywood wall 142 of the trailer 22.

In either mounting arrangement, to mount the connector portion 102 to the lid portion 100, 100', the connector portion 102 is pushed into engagement with the lid portion 100, 100' by passing the tubular wall 122 through the central aperture 112 in the lid portion 100, 100' until the respective pins 106 enter into the respective C-shaped portions 78 of the terminals 40, 40' mounted within the passageways within the cap 42. The tubular wall 122 of the connector portion 100, 100' seats within the outer wall 82 of the cap 42. The key 126, if provided, seats within the keyway 86 in the cap 42. The engagement of the key 126 within the keyway 86 ensures the proper orientation of the components. Other structures for properly orienting the components can be used and are within the scope of the invention. The apertures in the mounting flange 130 align with the respective apertures 118 in the second set provided through the outer wall 108 of the lid portion 100, 100'. The fasteners 104 are then mounted within the aligned apertures in the lid portion 100, 100' and the connector portion 102 to secure the connector portion 102 to the lid portion 100, 100'.

In either mounting arrangement, to remove the connector portion 102 from the lid portion 100, 100', the fasteners 104 are removed from the aligned apertures in the lid portion 100, 100' and the connector portion 102. The connector portion 102 is then pulled from engagement with the lid portion 100, 100'.

Figure 9:
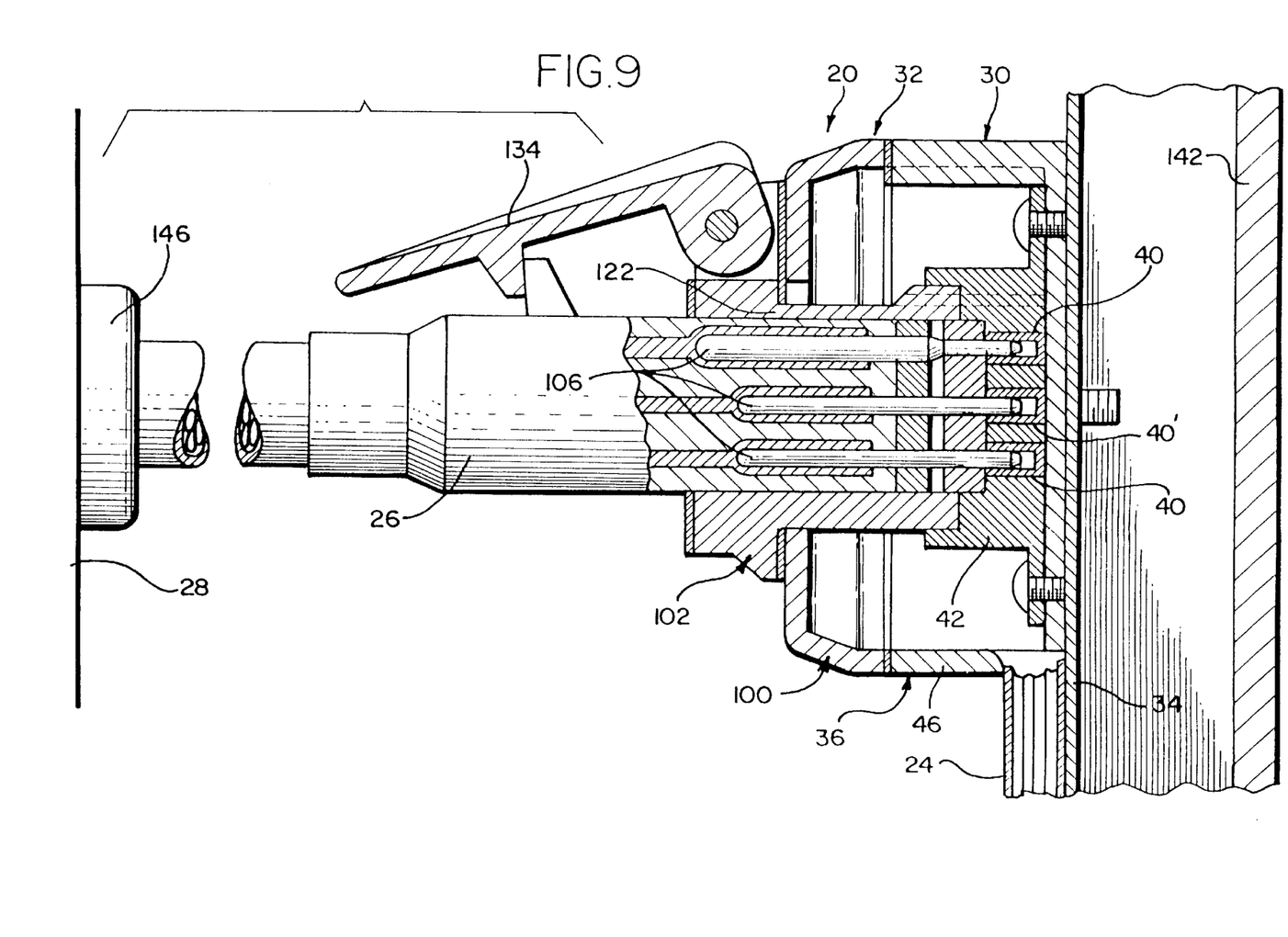
FIG. 9 is a cross-sectional view of the trailer connector identical to FIG. 6 and showing a connector from the trailer attached thereto.
Figure 10:
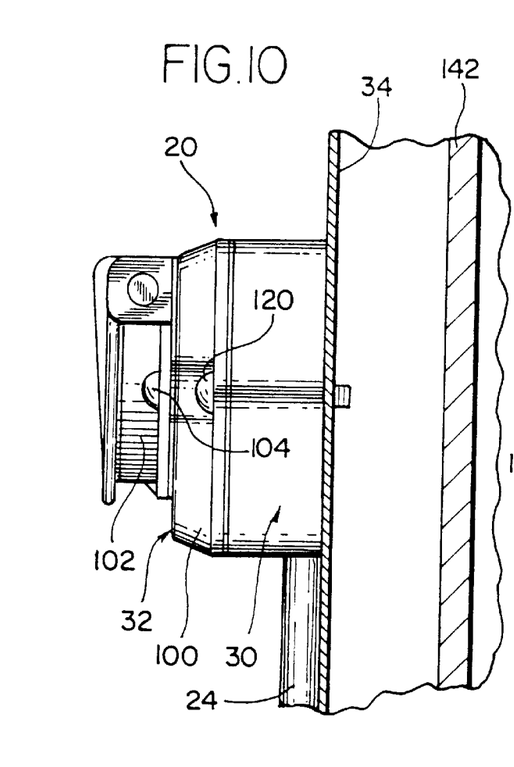
FIG. 10 is a partial cross-sectional view showing the mounting of the trailer connector as a surface mount.

The connector portion 102 provides an interface for the J560 connector 26. To connect the J560 connector 26 to the trailer connector 20 of the present invention, the cover 134 is opened to expose the pins 106 in the connector portion 102. The J560 connector 26 is pushed into the tubular wall 122 such that the pins 106 enter into the respective recesses on the J560 connector 26. As such, a plurality of electrical paths for electrical signals to pass from the tractor 28 to the trailer 22 are provided from the tractor connector 146, through the J560 connector 26, through the trailer connector 20 of the present invention, to the wiring harness 24 on the trailer 22. In the connection between the J560 connector 26 and the trailer connector 20 of the present invention, the electrical signal passes through the J560 connector 26, through the associated pin 106 in the connector portion 102, through the associated terminal 40 in the electrical housing assembly 30, and finally through the associated wire 92 from the wiring harness 24.

The J560 connector 26 that interfaces with the trailer connector of the present invention is conventional. That is, other manufacturers that make J560 connectors for the semi-trailer industry are able to take existing products and mate them with the trailer connector 20 of the present invention. This allows the end customer to have the ability to chose what J560 connector manufacturer they prefer.

Because the lid portion 100, 100' and the connector portion 102 are separate components, the connector portion 102 can be easily removed from the lid portion 100, 100' and the electrical housing assembly 30 by removing the two fasteners 104. The lid portion 100, 100' stays affixed to the electrical housing assembly 30 through the separate fasteners 120. This provides advantages in the present invention in that no wiring is attached to the connector portion 102, so installation of the connector portion 102 to the lid portion 100, 100' and to the electrical housing assembly 30 only requires that the operator push the connector portion 102 into engagement with the lid portion 100, 100' and the electrical housing assembly 30, and thereafter fasten the connector portion 102 to the lid portion 100, 100' using the fasteners 104. Removal of the connector portion 102 from the lid portion 100, 100' and the electrical housing assembly 30 only requires that the operator removes the fasteners 104 and pull the connector portion 102 from the lid portion 100, 100 and the electrical housing assembly 30.

The connector portion 102 is the most likely component to be damaged, so the trailer connector 20 of the present invention makes the connector portion 102 the most easy component to replace. All of the wiring is attached to the electrical housing assembly 30 and thus, wires do not need to be reattached by the operator when the connector portion 102 is replaced. By moving the wiring from the connector portion 102 to the electrical housing assembly 30, installation time is reduced in a factory installation and in a replacement installation, thereby improving efficiency and reducing worker frustration.

The printed circuit board slots 56, 60, 62 provided in the electrical housing assembly 30 allow for advance electronic measurement and control systems to be incorporated into the present invention. The slots 56, 60, 62 are molded directly into the ring 46 of the housing 36 and allow for easy insertion and removal of the printed circuits boards 64, 66. To do so, each printed circuit board 64, 66 is slid into or out of the associated slots 56, 60; 56, 62. Connection points for items such as annunciator lights can be provided in the electrical housing assembly 30.

The lid portion 100, 100' and the connector portion 102 can be combined to be an integral component. As such, the combined lid portion 100, 100' and connector portion 102 would attach directly to the electrical housing assembly 30 and could be detached from the electrical housing assembly 30 if the connector portion 102 needs to be replaced.

While preferred embodiments of the present invention are shown and described, it is envisioned that those skilled in the art may devise various modifications of the present invention without departing from the spirit and scope of the appended claims.

What is claimed is:

1. A connector for connecting a trailer to an associated tractor comprising:

a first assembly including a non-conductive housing mounted to the trailer, a plurality of terminals for providing electrical paths attached to said housing, respective ones of said terminals being electrically attached to respective ones of wires in a wiring harness provided on the trailer, an enclosure portion which generally surrounds said non-conductive housing and said terminals, and a lid portion attached to said enclosure portion, said lid portion having a cover which can be opened to expose the interior of said enclosure portion such that said terminals are exposed; and a second assembly including a non-conductive housing having a plurality of pins provided therethrough for providing electrical paths through said non-conductive housing of said second assembly, said pins having a first end portion and a second end portion, said first end portion extending outwardly from said housing and said second end portion being surrounded by said housing such that said second end portion is recessed within said housing, said second assembly being capable of being engaged with said first assembly by pushing at least a portion of said first end portion of said pins into engagement with said terminals and being capable of being disengaged from said first assembly by pulling said at least a portion of said first end portion of said pins out of engagement with said terminals, said first assembly maintaining its attachment to the trailer during the insertion and removal of said second assembly, wherein when said second assembly is engaged with said first assembly, respective ones of said pins are placed into electrical contact with respective ones of said terminals and said cover can be closed over said second assembly such that said pins are not exposed, said second end portion of said pins of said second assembly further being capable of being engaged with a connector which provides a plurality of electrical paths between the tractor and said second assembly when said cover is opened, said pins of said second assembly being capable of being disengaged from the connector.

2. A connector as defined in claim 1, wherein said first assembly includes a plurality of conductive studs mounted within said housing, each said terminal being connected to a respective one of said studs.

3. A connector as defined in claim 2, wherein each said terminal includes a socket.

4. A connector as defined in claim 1, wherein said housing of said first assembly further includes slots therein, and further including circuit boards mounted in said slots.

5. A connector as defined in claim 1, wherein said lid portion provides said mounting connection of said first assembly to the trailer.

6. A connector as defined in claim 1, wherein said enclosure portion provides said mounting connection of said first assembly to the trailer.

7. A connector as defined in claim 1, wherein said cover is spring loaded.

8. A connector as defined in claim 1, wherein said non-conductive housing of said first assembly has a plurality of passageways provided therein, and wherein respective ones of said terminals are in communication with respective ones of said passageways.

9. A connector as defined in claim 8, wherein when said second assembly is engaged with said first assembly, respective ones of said pins engage within respective ones of said passageways.

10. A connector as defined in claim 8, wherein each said terminal includes a socket, respective ones of said sockets being mounted within respective ones of said passageways.

11. A connector as defined in claim 10, wherein when said second assembly is engaged with said first assembly, respective ones of said pins engage with respective ones of said passageways and sockets.

12. A connector for connecting a trailer to an associated tractor comprising:

a first assembly including a non-conductive housing mounted to the trailer, a plurality of plurality of first means for providing electrical paths attached to said housing, respective ones of said first means being electrically attached to respective ones of wires in a wiring harness provided on the trailer, an enclosure portion which generally surrounds said non-conductive housing and said first means, and a lid portion attached to said enclosure portion, said lid portion including a cover which can be opened to expose the interior of said enclosure portion such that said first means are exposed; and a second assembly including a non-conductive housing having a plurality of second means for providing electrical paths provided therethrough for providing electrical paths through said non-conductive housing of said second assembly, said second assembly being capable of being engaged with said first assembly and being capable of being disengaged from said first assembly, wherein when said second assembly is engaged with said first assembly, respective ones of said second means are placed into electrical contact with respective ones of said first means, and said cover can be closed over said second assembly such that said second means are not exposed, said second means of said second assembly further being capable of being engaged with a connector which provides a plurality of electrical paths between the tractor and said second assembly, said second means of said second assembly being capable of being disengaged from the connector.

* * * * *

UNITED STATES PATENT AND TRADEMARK OFFICE
CERTIFICATE OF CORRECTION

PATENT NO.    : 6,450,833 B1
DATED         : September 17, 2002
INVENTOR(S)   : James B. Brown, Jr. and Danny Lee Gilbert It is certified that error appears in the above-identified patent and that said Letters Patent is hereby corrected as shown below:

<u>Column 8,</u>
Line 60, "a plurality of plurality of first" should be -- a plurality of first --

Signed and Sealed this

Fourth Day of March, 2003

JAMES E. ROGAN
*Director of the United States Patent and Trademark Office*